(12) United States Patent
Lelic

(10) Patent No.: US 6,493,480 B1
(45) Date of Patent: Dec. 10, 2002

(54) MULTISTAGE OPTICAL CROSS-CONNECT

(75) Inventor: Izudin Lelic, Corning, NY (US)

(73) Assignee: Corning Incorporated, Corning, NY (US)

( * ) Notice: Subject to any disclaimer, the term of this patent is extended or adjusted under 35 U.S.C. 154(b) by 49 days.

(21) Appl. No.: 09/628,456

(22) Filed: Jul. 31, 2000

(51) Int. Cl.⁷ .............................. G02B 6/26; G02B 6/42
(52) U.S. Cl. ............................ 385/17; 385/16; 385/18
(58) Field of Search ................................... 385/15–23

(56) References Cited

U.S. PATENT DOCUMENTS

| | | | |
|---|---|---|---|
| 5,009,477 A | * 4/1991 | Alferness et al. | 385/17 |
| 5,148,506 A | 9/1992 | McDonald | 385/16 |
| 5,181,134 A | * 1/1993 | Fatehi et al. | 359/117 |
| 5,627,925 A | * 5/1997 | Alferness et al. | 385/17 |
| 5,841,917 A | * 11/1998 | Jungerman et al. | 385/17 |
| 5,960,132 A | 9/1999 | Lin | 385/18 |
| 5,978,527 A | 11/1999 | Donald | 385/17 |
| 6,154,583 A | * 11/2000 | Kuroyanagi et al. | 385/16 |

OTHER PUBLICATIONS

Clos, Charles, "A Study of Non–Blocking Switching Networks", The Bell System Technical Journal, Mar. 1953, pp. 406–424.

* cited by examiner

*Primary Examiner*—Brian Healy
*Assistant Examiner*—Kevin S Wood
(74) *Attorney, Agent, or Firm*—Joanne N. Pappas

(57) ABSTRACT

A multi-stage optical cross-connect in which sub-switches within the respective stages are spatially distributed relative to sub-switches of adjacent stages such that each input/output of any given sub-switch is respectively optically coupleable with an output/input of a respective sub-switch of an adjacent stage by direct linear optical propagation or by non-interleaving waveguides, such that simple interconnection between stages is provided. The spatial distribution may be accomplished within a single plane or by layering the sub-switches within a given stage.

24 Claims, 13 Drawing Sheets

MULTISTAGE OPTICAL CROSS-CONNECT

BACKGROUND OF THE INVENTION

1. Field of the Invention

The present invention relates generally to optical switches for telecommunications and related applications, and particularly to multi-stage optical cross-connects.

2. Technical Background

A cross-connect is generally a big, complex switch, or, more specifically, a device for connecting any one of N signal inputs to any one of M signal outputs. Large cross-connects in practical use today employ complex electronic switching. But because optical signals can carry data for much greater distances at much greater rates than electronic signals, development of optical cross-connects is proceeding in response to ever increasing demand for higher capacity, more efficient telecommunications.

The basic logical structure of a cross-connect is shown schematically in FIG. 1. Any one of the input lines 20 may be selectively connected to any one of the output lines 30. This may be achieved, for example, by a plurality of switching devices positioned at respective cross-points 40 between the input and output lines, where each switching device allows a connection to be selectively established between the associated input and output lines.

In an optical cross-connect, the input lines 20 of FIG. 1 may take the form of waveguides of various forms including those formed on or in a substrate, or optical signal beam paths for unconfined beams propagating in free space or in another medium, or the like. Optical signals entering such a cross-connect along the input lines 20 in the direction A, for example, may be redirected at selected ones of the cross-points 40 so as to exit the switch along desired ones of the output lines 30 in direction B, for example.

Depending on the particular switching devices employed and other factors, the geometry of a typical optical cross-connect may vary from that shown in FIG. 1. For example, the intersection of waveguides or beam paths may be at angles other than right angles, and inputs may arrive in more than one direction A, and outputs may leave in more than one direction B, as shown in FIG. 2, for example. Inputs and outputs may also be interchangeable and/or physically indistinguishable in an optical switch, so one line may function as either or both. Accordingly, while "input" and "output" will be used for convenient reference herein, it is to be understood that these are equivalent terms in the context of the optical switches as described and claimed herein, and are understood not to limit the structure and functionality of the inventive devices thus described.

Devices employing frustrated total internal reflection are also known to those of ordinary skill in the art. All these and such other switching devices as known to those of skill in the art may be used in optical switches of the type shown schematically in FIGS. 1 and 2.

One example of such switching devices are small mechanical mirrors known as "MEMS" (Micro-Electro-Mechanical Systems) mirrors. MEMS mirrors can be used with either a beam-based or a wave-guide based switch. In either case, the mirrors are positioned at or near the cross-points 40 and are controllably moveable so as to be selectively inserted at the respective cross-points. With a mirror inserted at a selected cross-point, a beam or a guided wave arriving at that cross-point is redirected from direction A to direction B at that cross-point. In a switch employing inputs from two directions A as in FIG. 2, double-surfaced mirrors can be used. An example wave-guide and MEMS-mirror switch is disclosed in U.S. patent application Ser. No. 99/24,591, filed Oct. 20, 1999, assigned in common with the present application and incorporated herein by reference. An example free-space beam and MEMS mirror optical switch is disclosed in U.S. Pat. No. 5,960,132 also incorporated herein by reference.

Another example switching device suggested for use in optical switches of the type shown schematically in FIG. 1 is a fluid injection device. By injecting a fluid into (or removing a fluid from) a cross-point of a waveguide structure, the index of refraction can be varied at the cross-point so as to reflect an incoming guided wave arriving at the crosspoint into the associated output waveguide. The construction and use of such a switching device is disclosed, for example, in U.S. Pat. No. 5,978,527 incorporated herein by reference.

Another example switching device suggested for use in optical switches of the type shown schematically in FIG. 1 uses liquid crystals formed within the waveguides at the respective cross-points. The construction and use of such devices is disclosed in U.S. patent application Ser. No. 09/604,039 and U.S. patent application Ser. No. 09/431,430, commonly assigned with the present application and incorporated herein by reference.

Devices employing techniques such as photonic crystals or frustrated total internal reflection are also known to those of ordinary skill in the art. All these and such other switching devices as known to those of skill in the art may be used in optical switches of the type shown schematically in FIGS. 1 and 2.

Where waveguides are used (rather than beams) for light propagation within the switch, the crossing pattern of the input and output lines shown in FIGS. 1 and 2 may be folded back on itself, such as is as shown schematically in FIG. 3. An example of a switch of this design using MEMS mirrors is disclosed in U.S. Pat. No. 5,148,506, incorporated herein by reference.

While all of the above-described switching devices may be useful in switch designs such as those of FIGS. 1–3, as the scale of the switch increases, these switch designs are less practical. The number of cross-points typically increases as the number of inputs times the number of outputs, making large-scale switches, such as 1024×1024 for example, difficult to implement.

It is well known that larger cross-connects can be formed from several smaller cross-connects linked together. One way of linking non-blocking cross-connects together to produce a larger non-blocking cross-connect is illustrated in FIG. 4.

FIG. 4 shows an example layout for an arrangement known as a three-stage Clos network. The network shown, as a whole, provides an N×N non-blocking cross-connect. Stage 1 includes multiple cross-connects, each with n inputs and 2n−1 outputs, as illustrated for cross-connect number 1 of Stage 1. The N inputs to the network are received by a total of N/n of these cross-connects in Stage 1. For each of the N/n cross-connects of Stage 1, each of the 2n−1 outputs are routed to a respective Stage 2 cross-connect, as illustrated for cross-connect 2 of stage 1. Stage 2 includes 2n−1 cross-connects, one for each output of the Stage 1 cross-connects. Each cross-connect of stage 2 has N/n inputs and outputs. For each of the 2n−1 cross-connects of stage 2, each of the N/n outputs are routed to a respective Stage 3 cross-connect, as illustrated for cross-connect 2 of Stage 2.

Stage 3 includes N/n cross-connects, one for each output of the Stage 2 cross-connects. Each of Stage 3 cross-connects has 2n−1 inputs and n outputs. The n outputs of all of the Stage 3 cross-connects together provide the N outputs of the network. As may be appreciated from FIG. 4, the interconnections between the stages in such a multi-stage switch can be complex.

SUMMARY OF THE INVENTION

The present invention includes, in one aspect, a multi-stage optical cross-connect including a first stage having a plurality of first stage sub-switches each structured and positioned so as to receive inputs along a plurality of first stage input directions and to send outputs along a plurality of first stage output directions, and a second stage including a plurality of second stage sub-switches each structured and positioned so as to receive inputs along a plurality of second stage input directions and to send outputs along a plurality of second stage output directions, and a third stage including a plurality of third-stage sub-switches each structured and positioned so as to receive inputs along a plurality of third stage input directions and to send outputs along a plurality of third stage output directions, wherein, for each first stage sub-switch, each of the output directions of said sub-switch is each aligned with an input direction of a respective second stage sub-switch, and each of the output directions of said sub-switch is each aligned with an input direction of a respective third stage sub-switch. When each sub-switch is configured as a simple M×N non-blocking cross-connect of the type shown in FIG. 1, this results in a greatly simplified three-stage optical switch with at most three changes of direction and three switch devices within each optical path. This cross-connect may be implemented all in a single plane or in multiple planes or on multiple substrates according to the various embodiments disclosed herein.

In another aspect, the invention includes a first, second, and third stages each including multiple layers, each layer including a non-blocking cross-connect sub-switch having inputs and outputs. The first-stage layers are arranged such that the inputs of the first-stage layers are arranged in a two-dimensional first-stage input matrix and such that the outputs of the first-stage layers are arranged in a two-dimensional first-stage output matrix. The second- and third-stage layers are arranged similarly, thus providing second and third stage input and output matrices. Each of the outputs of the first-stage output matrix is optically connected to a respective input of the inputs of the second-stage input matrix via respective non-interleaving first-to-second-stage optical connections, and each of the outputs of the second-stage output matrix is optically connected to a respective input of said inputs of the third-stage input matrix via respective non-interleaving second-to-third-stage optical connections. This provides a greatly simplified interconnection scheme for a three-stage optical cross-connect. The optical connections may take various forms including "pig-tailed" waveguides, or direct coupling of planar waveguides, or free-space beam propagation.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Reference will now be made in detail to presently preferred embodiments of the invention, examples of which are illustrated in the accompanying drawings. Wherever possible, the same reference numbers will be used throughout the drawings to refer to the same or like parts.

The present invention provides an architecture for a multi-stage optical cross-connect in which sub-switches within the respective stages are spatially distributed relative to sub-switches of adjacent stages such that each input/output of any given sub-switch is respectively optically coupleable with an output/input of a respective sub-switch of an adjacent stage by direct linear optical propagation or by propagation through non-interleaving waveguides, such that simple interconnection between stages is provided. The desired spatial distribution may be accomplished within a single plane or by layering the sub-switches within a given stage, as will be seen from the description of various embodiments below.

Figure 5:
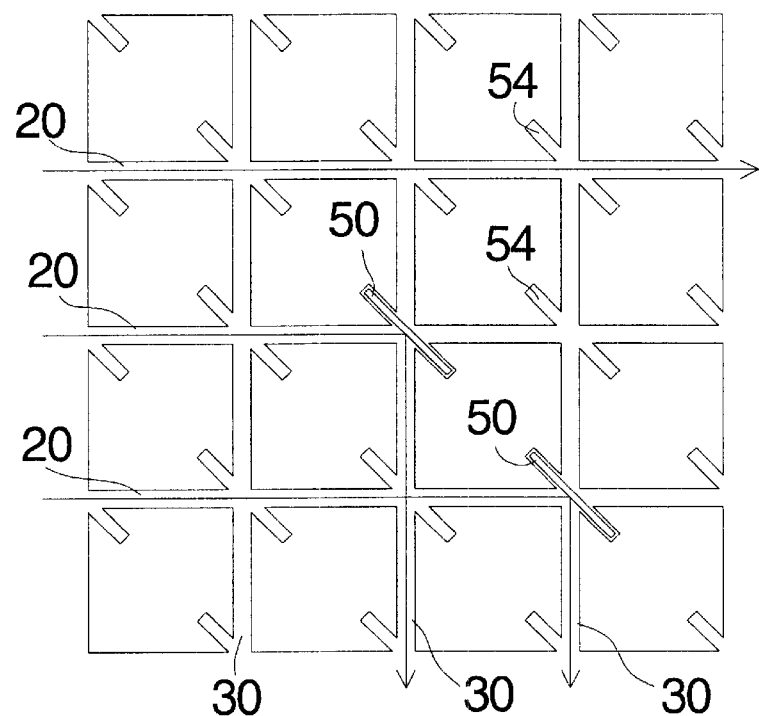
FIG. 5 is a plan view of a portion of an embodiment of a waveguide-based switch with which the present invention may be used or applied.
Figure 6:
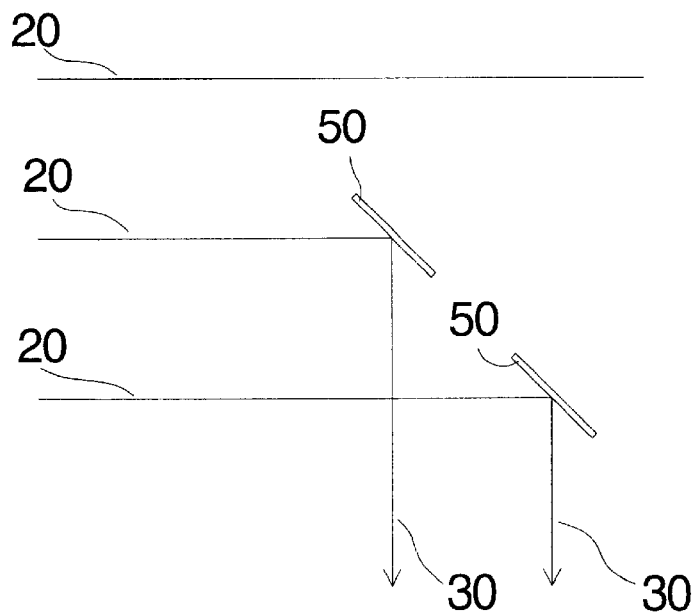
FIG. 6 is a plan view of a portion of an embodiment of a free-space beam-based switch with which the present invention may be used or applied.

An example of switch devices useful with the present invention is shown in FIG. 5, which is a plan view of a portion of a waveguide- and MEMS-based optical switch. Optical signals propagating in the switch, represented by the arrows in the figure, are confined within input waveguides 20 and output waveguides 30. Moveable mirrors 50 can be moved into or out of trenches 54 in the cross-points of the input waveguides 20 and the output waveguides 30. When a mirror is in position within a cross-point, a signal arriving at the cross-point from the associated input is redirected by the mirror 50 into the associated output waveguide, as represented by the arrows in the figure. As shown in FIG. 6, a similar principle of operation applies also in a switch employing optical beams rather than waveguides. In this case, the arrows in the figure represent optical beams.

In addition to MEMS mirrors, other switch devices such as those described above are also useful in the context of the present invention. Because MEMS mirrors are the presently preferred switch device, the description of the invention below will be set forth in terms of MEMS mirrors, with the understanding that any other suitable switch technology may also be employed within the architecture of the present invention.

Figure 7:
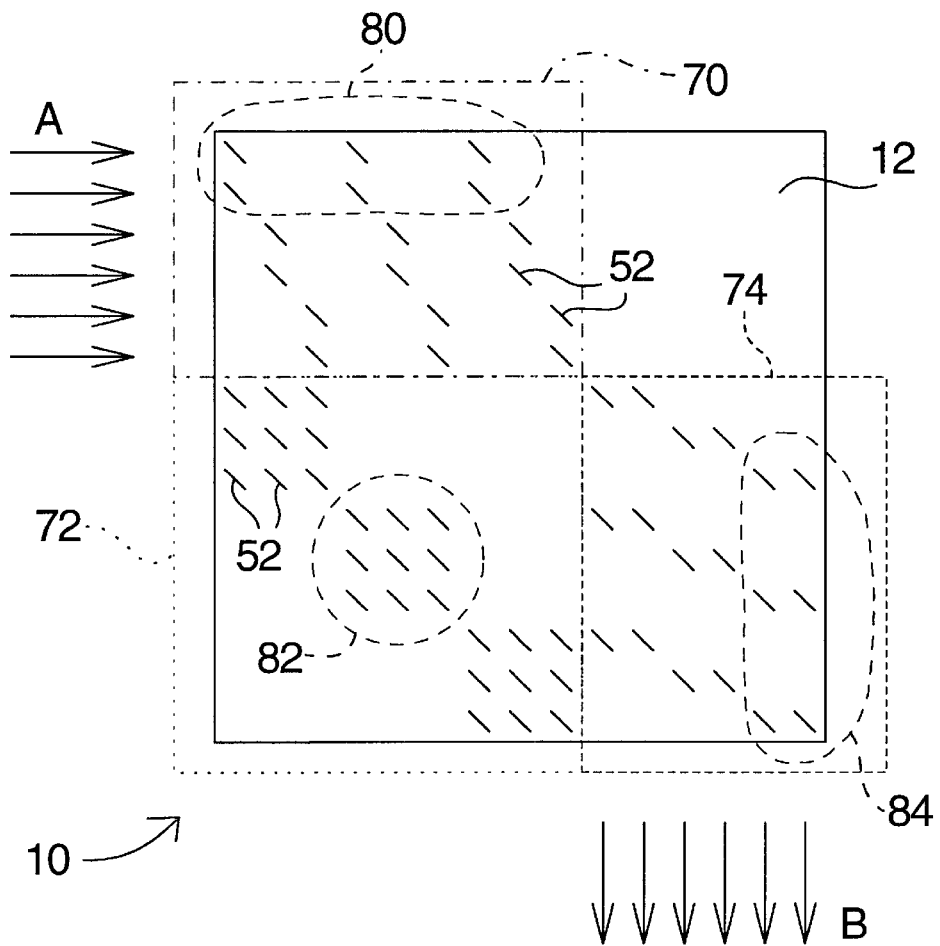
FIG. 7 is a schematic diagram showing an embodiment of an optical cross-connect switch of the present invention.

FIG. 7 shows a diagrammatic plan view of one embodiment of the present invention. The embodiment as shown represents a N×N cross connect 10 in the form of a three-stage Clos network with N=6 and n=2. The three stages are laid out in three separate areas of the switch on a supporting structure or substrate 12.

The light paths or waveguides employed in the switch embodiment of Figure lie in a common plane. Input signals are received along the paths shown by the arrows A. Output signals are output along the paths shown by the arrows B. Mirror positions 52 are distributed within the plane of the light paths such that a three-stage switch is provided in which every light path from input to output undergoes only three changes of direction. This is enabled in part by grouping the three stages into respective areas of the switch. Stage one of the switch is within the area 70 (including the equivalent of three cross-connects or sub-switches, one of which is sub-switch 80) stage two within the area 72 (including the equivalent of three cross-connects or sub-switches, one of which is sub-switch 82), and stage 3 within the area 74 (including the equivalent of three cross-connects or sub-switches, one of which is sub-switch 84).

Within each of the three stages, the mirror positions corresponding to individual sub-switches are spatially arranged, relative to the sub-switches of the adjacent stage(s), so as to be spatially distributed over the spatial range of the sub-switches of the adjacent stage(s). This means, in the embodiment shown in FIG. 7, for example, that the mirror positions 52 of mirrors that make up the sub-switch 80 are spread out (in the left-to-right direction in the figure) so as to be spatially distributed over the cross-connect 82 in stage 2 (area 72), and over the two other cross-connects within stage 2. The interconnection between stage 1 and stage 2 is thus achieved by a direct optical path from a mirror of one of the first-stage sub-switches, without the complexity of any additional mirrors or any interleaving optical interconnects.

Figure 1:
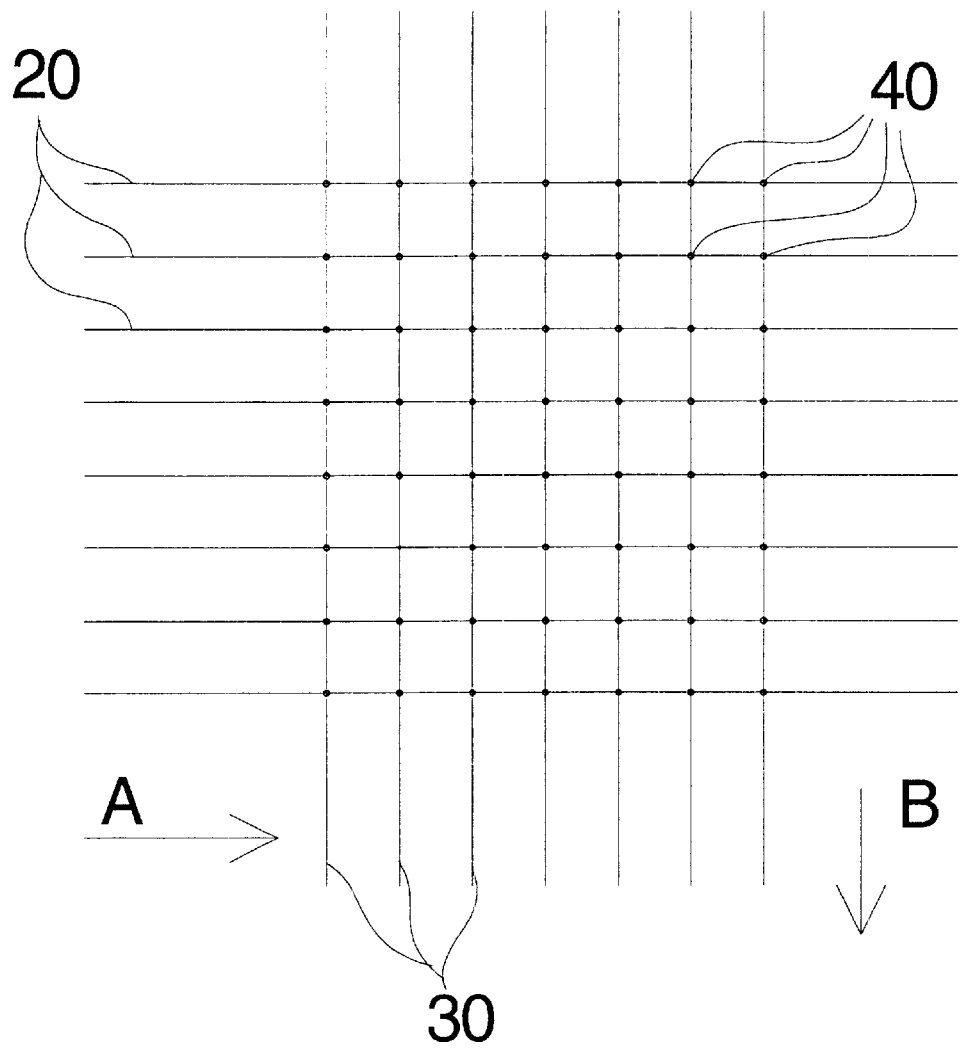
FIG. 1 is a schematic diagram of a type of cross-connect.
Figure 2:
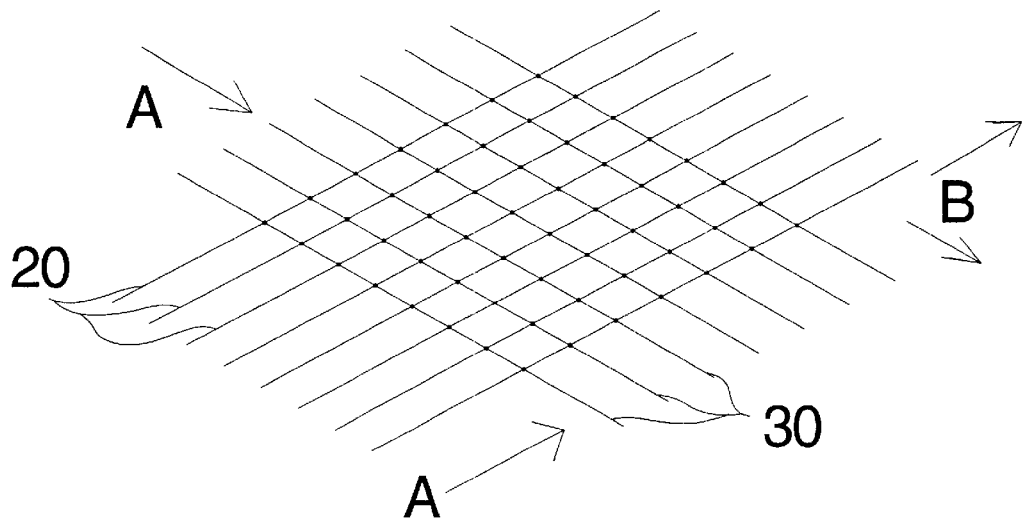
FIG. 2 is a schematic diagram of a variation of FIG. 1.
Figure 8:
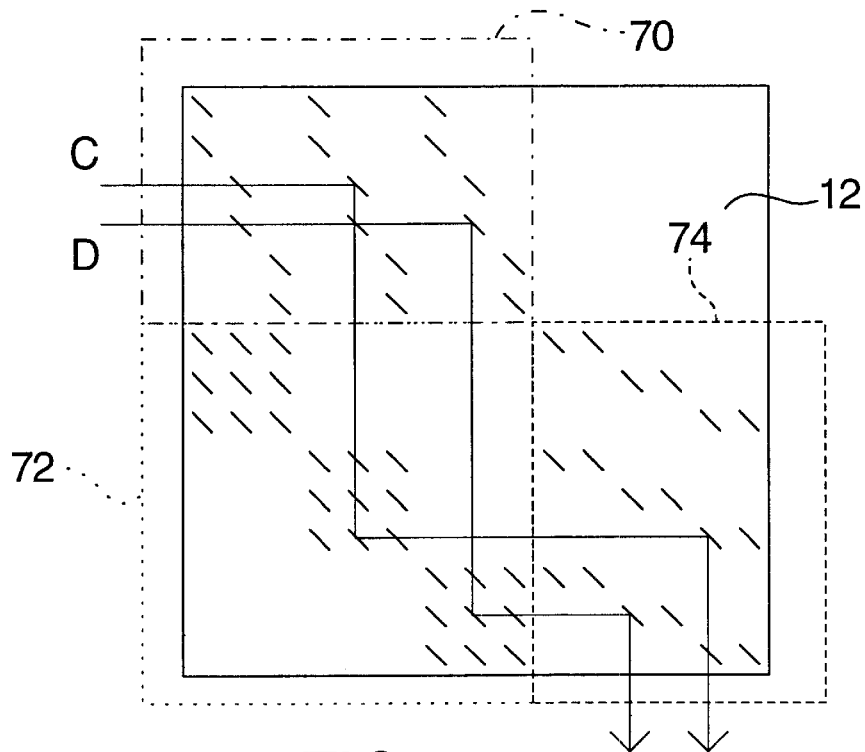
FIG. 8 is a diagram of the embodiment of FIG. 7 with two example optical paths shown thereon.

The simplicity of the optical paths through the switch is illustrated in FIG. 8, which shows the same mirror position layout as shown in FIG. 7, along with two example optical paths through the switch indicated by the arrows C and D. Each path is reflected once in each stage of the switch, and includes no other reflections. This provides a very simple, loss-reducing architecture for a multiple-stage optical switch. Loss uniformity is also improved over the basic layout shown in FIG. 1 above, because of the increased uniformity among the possible paths through the switch. As another advantage, this architecture requires only single-sided switch devices, such as single-sided MEMS mirrors, to effect the redirection of light within each stage. Double-sided mirrors or the like are not required.

Figure 9:
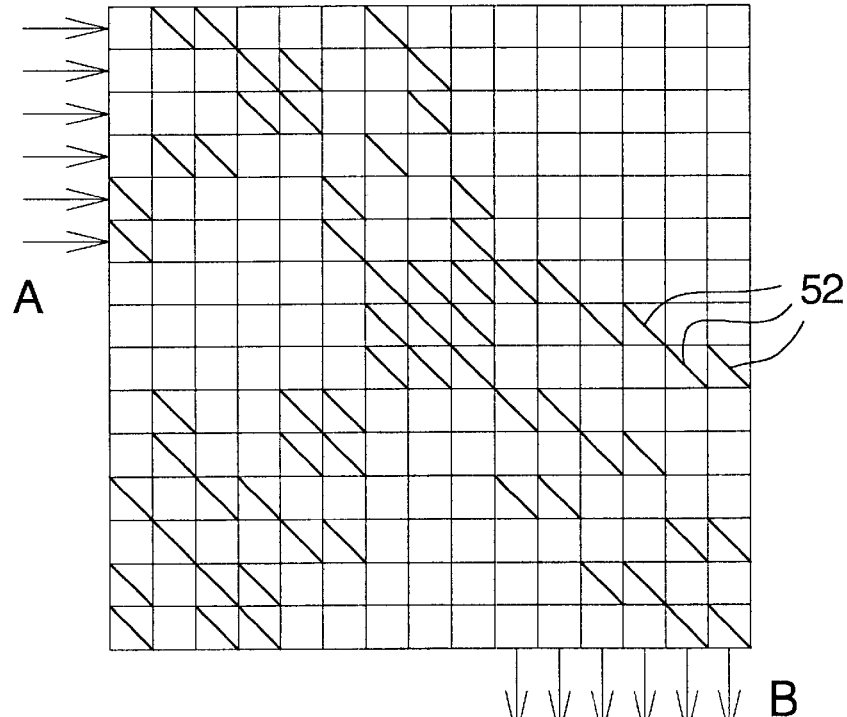
FIG. 9 is a schematic diagram showing a variation of the embodiment of an optical cross-connect switch of the present invention shown in FIG. 7.
Figure 10:
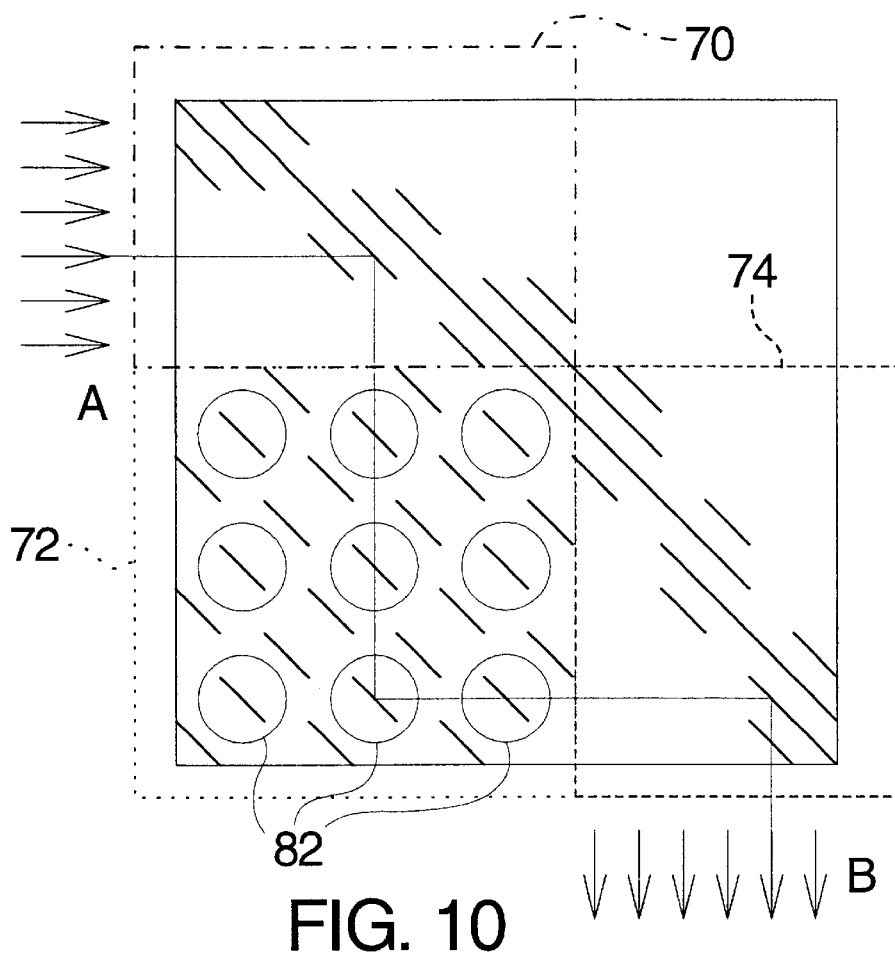
FIG. 10 is a schematic diagram showing another variation applicable to the embodiment of FIG. 7.

FIG. 9 illustrates an embodiment of the optical switch of the present invention with the mirror positions within each of the stages rearranged relative to those shown in FIGS. 7 and 8, with grid lines for positional reference. The layout of mirror positions in FIG. 9 shows the potential for variation while preserving the simplified interconnection of the stages. FIG. 10 shows a variation of the layout of the mirror positions in which the sub-switches of the first and third stages are spatially compact while the sub-switches of the second stage are distributed in space over the sub-switches of the first and third stages. The mirror positions marked with circles correspond to those of sub-switch 82. As shown in the figure, the mirror positions of sub-switch 82 are spatially distributed over all of the sub-switches of the first stage and over all of the sub-switches of the second stage, which results in this case in an interleaving of the mirror positions of the sub-switches of the second stage.

Figure 11:
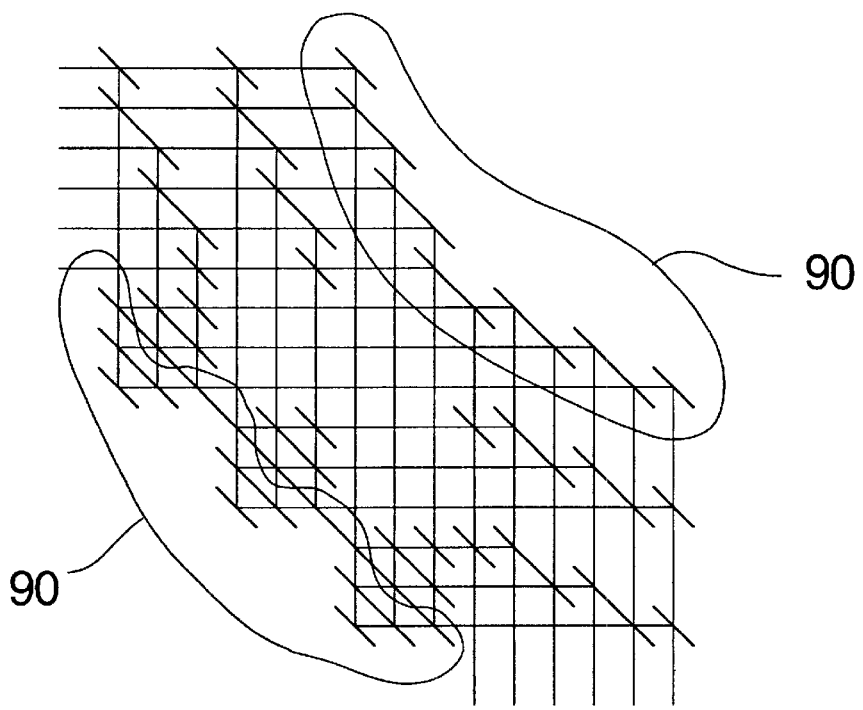
FIG. 11 is a diagram of the light paths of the embodiment of FIG. 7.
Figure 12:
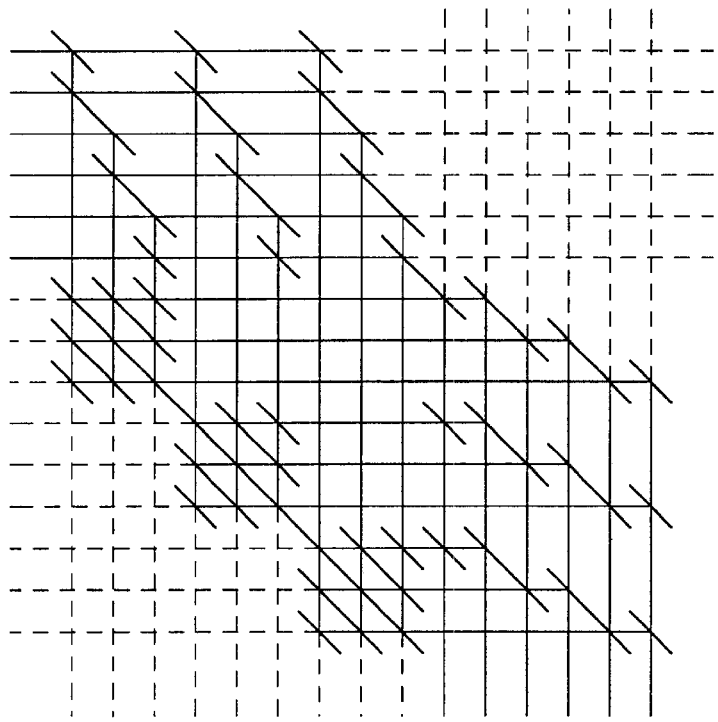
FIG. 12 is a diagram of the light paths of another variation of the embodiment of FIG. 7.

FIG. 11 is a diagram of the positions of the mirrors of the embodiment of FIG. 7, with each possible light path represented by a line. The mirrors at the ends of the possible light paths, i.e., the mirrors at the mirror positions within the curves 90 in FIG. 11, can be fixed mirrors. This significantly decreases the number of moveable mirrors or other switch devices otherwise required. On the other hand, if either or both sets of mirrors at the ends of the light paths are made moveable, the additional light paths shown as dashed lines in FIG. 12 may be utilized to provide both add-drop and cross-connect functions in the same optical switch.

Figure 13:
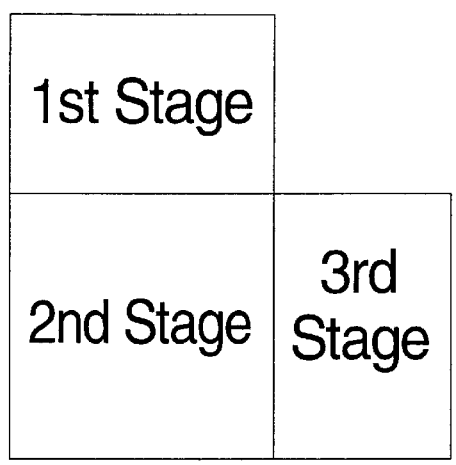
FIG. 13 is a diagram representing the relative locations of the three stages of the switch network of the embodiment of FIG. 7.

As may be seen from the foregoing, one of the architectural principles that facilitates the advantages provided by the above embodiments is the division of the switch into stages with spatial division of the stages into separate areas of the switch. FIG. 13 shows this basic layout.

Figure 4:
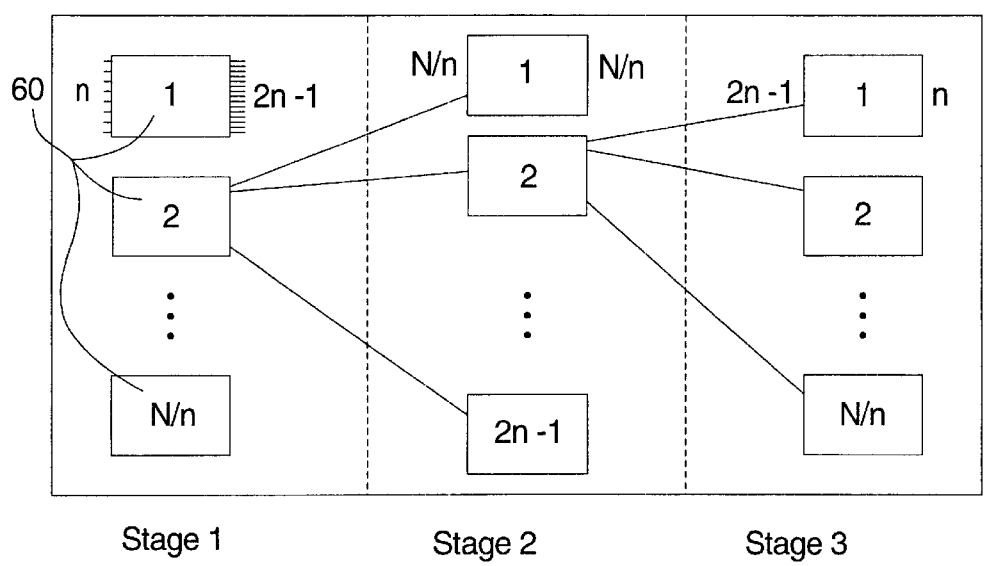
FIG. 4 is a schematic diagram of a three-stage Clos network.

The switch embodiments as shown in FIGS. 7–12 are represented as 6×6 cross-connects in order that each mirror position may be clearly shown. Desirably, multi-stage optical cross-connects according the present invention are of larger scale, because the benefits of using multiple stages are greater as the scale of the cross-connect increases. For a three-stage Clos network as illustrated in FIG. 4 above, the required number of mirror positions (counting both mirrors that must be moveable and mirrors that may be stationary if desired) i.e., the total number of cross-points is $$(2n-1) \cdot \left(2N + \frac{N^2}{n^2}\right) \quad (1)$$

where N is scale of the switch (i.e., where the switch is an N×N cross-connect), n is the number of inputs for each first-stage sub-switch, and (2n-1) is the number of sub-switches in the second stage. By setting equal to zero the derivative of (1) with respect to n, the minimum number of cross-points is obtained when:

$$2n^3 - Nn + N = 0 \quad (2)$$

Approximating by taking N and n as relatively large gives $$N = \frac{2n^3}{n-1} \cong 2n^2 \quad (3)$$

which means that the preferred n for minimizing the total number of cross points is:

$$n = \sqrt{\frac{N}{2}} \quad (4)$$

Of course within the constraints of the switch architecture, n must be an integer and is preferably chosen to be a factor of the desired total inputs for the switch. For example, with N of 100 (to give a 100×100 cross-connect), (4) becomes about 7. The closest integers that are also factors of 100 are 5 and 10. Using (1) to determine the total cross-points for n of both 5 and 10, n of 10 results in 5700 cross-points while n of 5 results in 5400, so n of 5 would be chosen to minimize the total cross-points. Alternatively, even the size of the switch might be chosen with minimization of cross-points in mind. An n of 7, in a 98×98 switch, gives only 5096 total cross-points, for example. This compares favorably with the total of 9604 required for a 98×98 switch in a single-stage architecture like that shown in FIG. 1.

Figure 14:
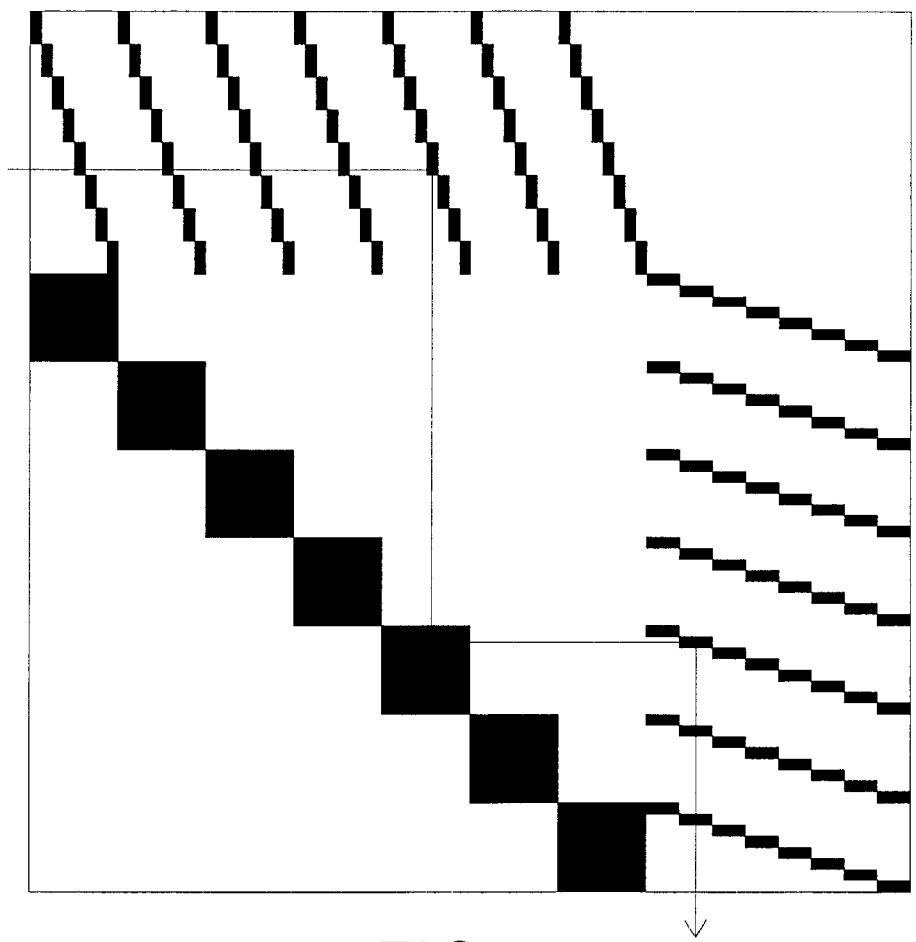
FIG. 14 is a diagram showing the positions of switching devices for a 32×32 embodiment of the type shown in FIG. 7.

FIG. 14 shows a schematic representation of the layout of mirror positions for a 32×32 cross-connect, a potentially more desirable scale for use with the present invention than that of the example in FIG. 7. Each shaded rectangle in the first and third stage areas represents four mirror positions, while the shaded squares in the second stage area each represent an 8×8 matrix of mirror positions. With N=32 and n=4, the total number of mirror positions or cross-points is 896, compared to 1024 for the one-stage architecture. Moreover, the number of mirror positions at which fixed mirrors can be employed, if desired, is greater than in the single-stage architecture.

One significant aspect of the above-described embodiments of the present invention is that the sub-switches of one stage are distributed in space over the spatial range of the sub-switches of the adjacent stage, thus greatly facilitating interconnection of the stages.

According to yet another embodiment of the present invention, this desired spatial distribution may accomplished by using separate stacked substrates or layers for each of the sub-switches within a stage, and by aligning the layers such that planes in which the layers lie intersect with corresponding planes of corresponding layers in the adjacent stage(s). One embodiment of this aspect of the present invention is shown in FIG. 15.

Figure 15:
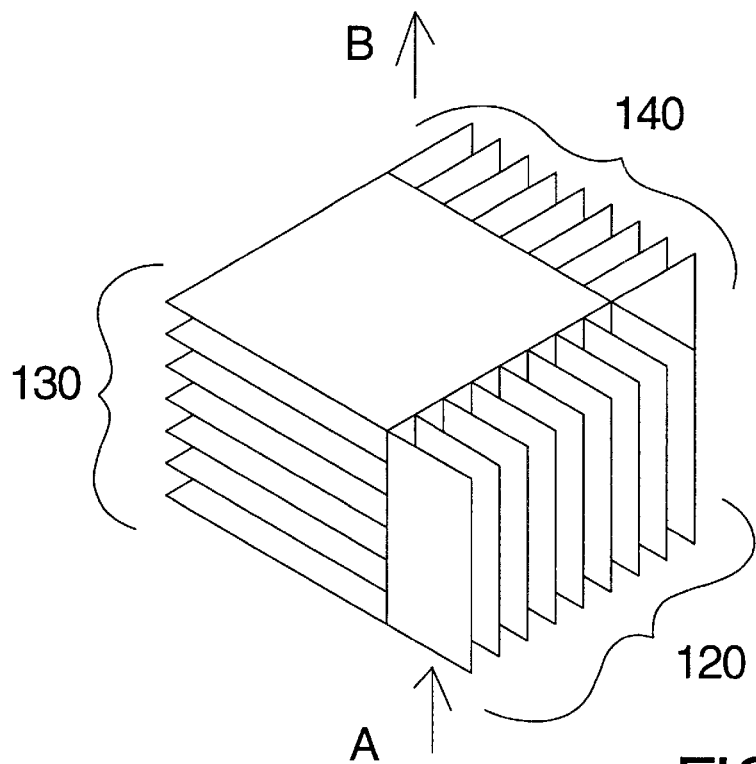
FIG. 15 shows a three-dimensional schematic diagram of the relative positions of subswitches in another embodiment of an optical switch according to the present invention.

FIG. 15 shows a perspective view of an embodiment of a multi-stage optical cross-connect according to the present invention. A group of substrates 120 forms the first stage of the switch. Each substrate of the substrates 120 includes one sub-switch of the first stage. Similarly, a group of substrates 130 forms the second stage of the switch, with one sub-switch per substrate, and a group of substrates 140 forms the third stage of the switch, with one sub-switch per substrate.

Each of the first-stage substrates 120 is aligned such that the planes in which the substrates 120 lie intersect the planes in which the substrates 130 lie that form the second stage of the switch. Each of the second-stage substrates is likewise aligned such that the planes in which the substrates 130 lie intersect the planes in which the substrates 140 lie. Outputs of the first stage sub-switches are aligned and abutted to inputs of the second-stage sub-switches, and outputs of the second stage sub-switches are aligned and abutted to the inputs of the third-stage sub-switches, with an index-matching gel or adhesive or the like placed at the interfaces to allow low-loss direct optical coupling.

Figure 16:
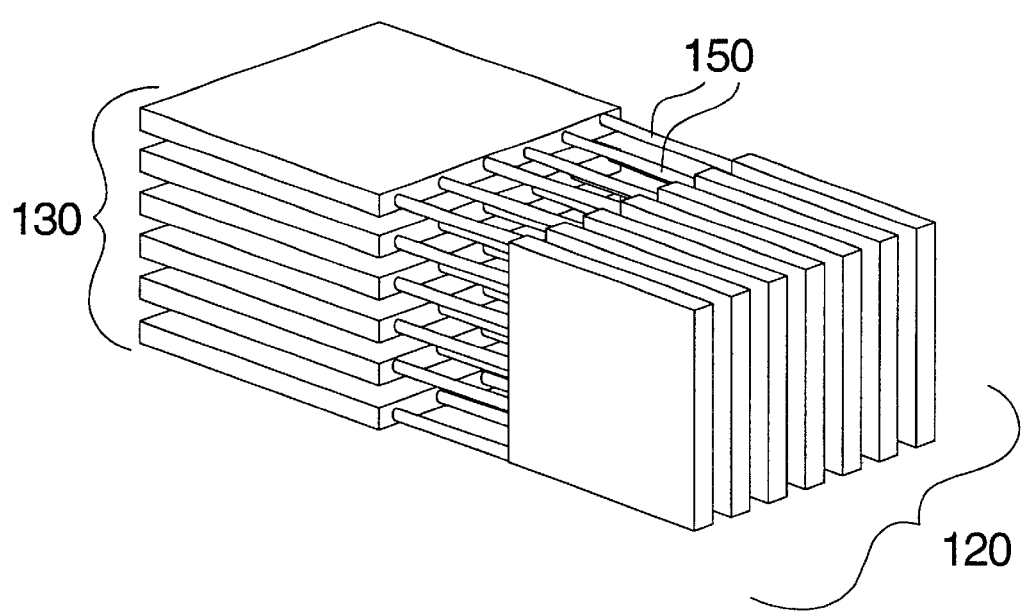
FIG. 16 is a perspective view of a portion of a variation of the embodiment of FIG. 15.

Alternatively, the substrates of successive stages may be interconnected by individual waveguides 150 as shown in FIG. 16, or by other suitable interconnections such as fiber ribbons and the like. If flexible or curved waveguides are used for interconnection, other configurations are of course possible, and the intersecting plane relationships described above with respect to FIG. 15 are not essential. Even with waveguide interconnections, the interconnections themselves are greatly simplified in that no interweaving of the waveguides is required, as may be seen in FIG. 16.

One important advantage of the embodiment of FIGS. 15 and 16 over that of FIGS. 7–14 is in the size of the substrate(s) required. In the embodiment of FIGS. 15 and 16, the sub-switches of one stage are spatially distributed over the sub-switches of the adjacent stages by the crossways orientation of the substrates of the adjacent stages, or by the non-interwoven waveguide interconnections made possible by the stacked multiple-substrate stage architecture. This compresses the required spatial distribution of the switches within a particular sub-switch. Although the embodiments of FIGS. 15 and 16 require many substrates, the size of the largest required substrate is thus much reduced. In the case of a MEMS-mirror based switch devices, for example, smaller substrates enable higher yields with decreased demands on the fabrication process.

Figure 17:
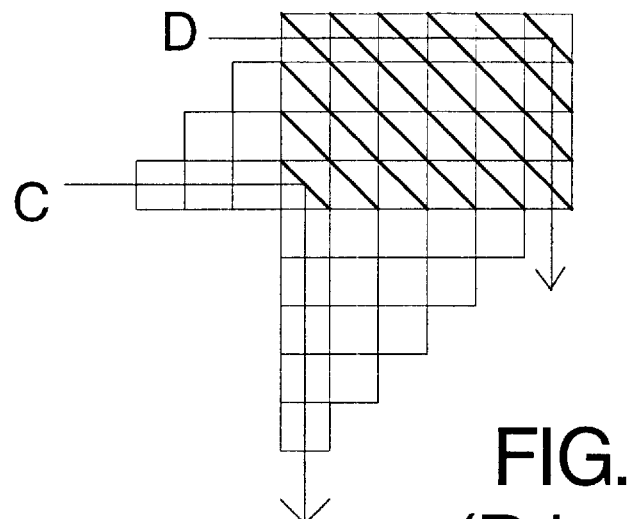
FIG. 17 is a diagram of another of a known design for improved loss uniformity in an optical cross-connect.

FIG. 17 shows a known design technique for optical cross-connects. Increased path length is provided for the shortest optical paths though a given switch or sub-switch. For a switch including a matrix of mirror positions as shown in FIG. 17, the optical path indicated by the arrow C would typically be significantly shorter than the longest path length as indicated by the arrow D, since path C penetrates the least into the matrix of mirror positions. In the switch of FIG. 17 however, the path length of path C has been made equal to all the other possible paths through the switch or sub-switch by adding an appropriate amount of path length both before the path enters the matrix of mirror positions and after the path leaves. The amount of path length added before corresponds to the amount of path length saved within the matrix of mirror positions by virtue of the point of entry into the matrix of mirror positions, and the amount of path length added after corresponds to the amount of path length saved within the matrix of mirror positions by virtue of the point of exit from the matrix. Making the path lengths equal for all possible paths through the switch provides more uniform optical performance, particularly more uniform and predictable loss.

Figure 18:
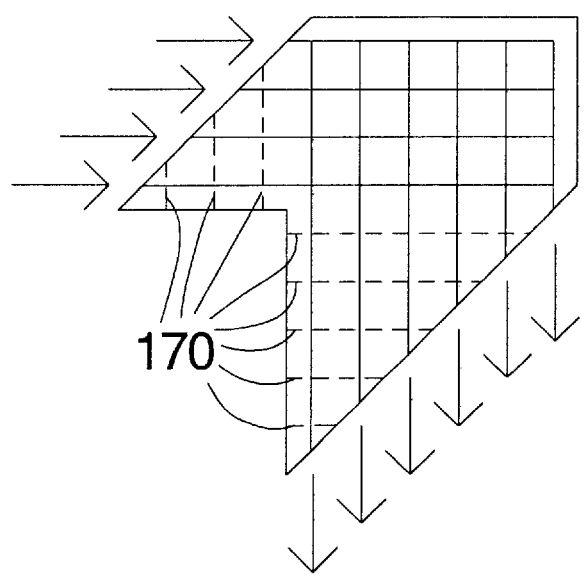
FIG. 18 is a diagram showing a known variation of the technique of FIG. 17.

In the case of a switch employing waveguides to define the light paths within the switch with trenches 54 as shown in FIG. 5 above, the trenches have an impact on the loss experienced by a propagating wave. For a waveguide-based design with trenches, it is known to include one or more dummy trenches 170, as shown in FIG. 18, within the increased length of the waveguides. The dummy trenches are so designed to provide the same or similar losses for each possible path through the switch. Dummy trenches may be used to provide such loss equalization even without path length equalization, since they may be compressed into less path length if desired.

Figure 19:
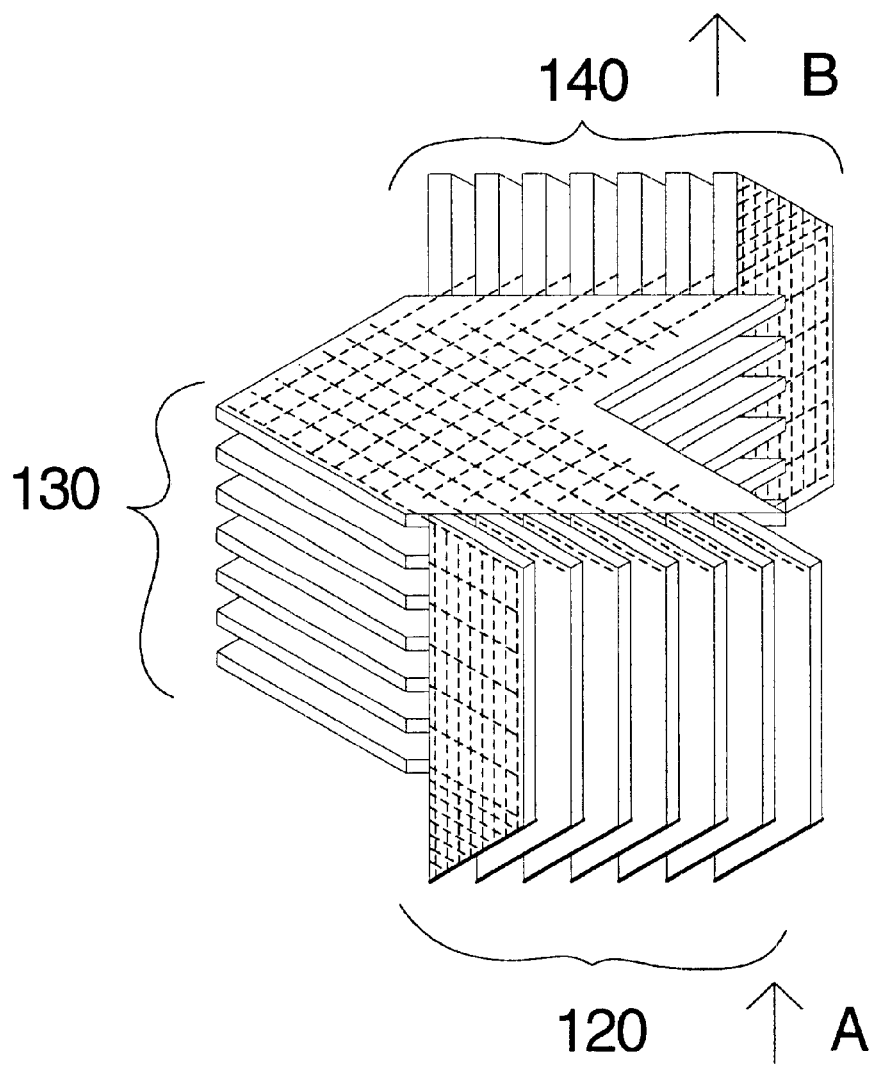
FIG. 19 is a diagram of an embodiment of an optical switch according to the present invention incorporating loss-uniformity but with decreased total loss.

According to yet another aspect of the present invention, optical path length equalization and/or loss equalization is applied to the embodiments of FIGS. 15 and 16 in a particularly advantageous manner, as shown in FIG. 19. FIG. 19 is a perspective view of an example embodiment of an optical cross-connect according to the present invention in which all optical paths through the cross-connect have essentially the same length and the essentially same loss. The dotted lines represent waveguides and dummy trenches for one of the sub-switches of each of the three stages, with other sub-switches having corresponding waveguides (not shown).

In the cross-connect of FIG. 19, each sub-switch of sub-switches 130 of the second stage has equalized path lengths for every possible path.

Figure 20:
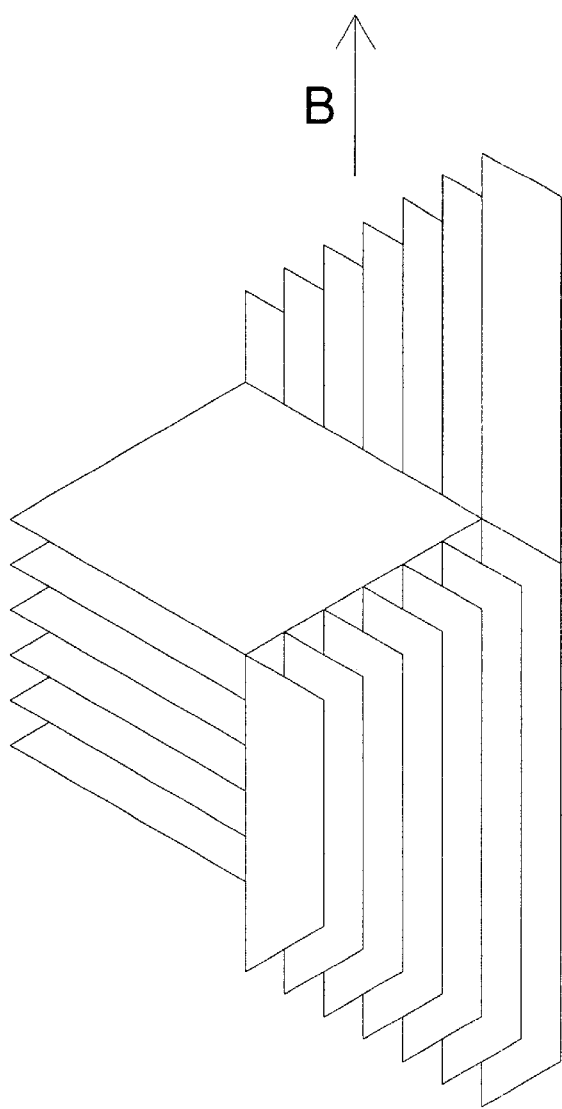
FIG. 20 is a diagram of still another embodiment of an optical switch according to the present invention.

As an alternative example embodiment to that of FIG. 19, FIG. 20 shows a perspective view of a three-stage, multiple substrate cross-connect in which path equalization for the cross-connect as a whole is accomplished entirely within the first and second stages. The principle is the same, but the path length savings resulting from a particular path through the second stage is balanced by additional length in the first and second stages, rather than in the second stage itself.

Figure 3:
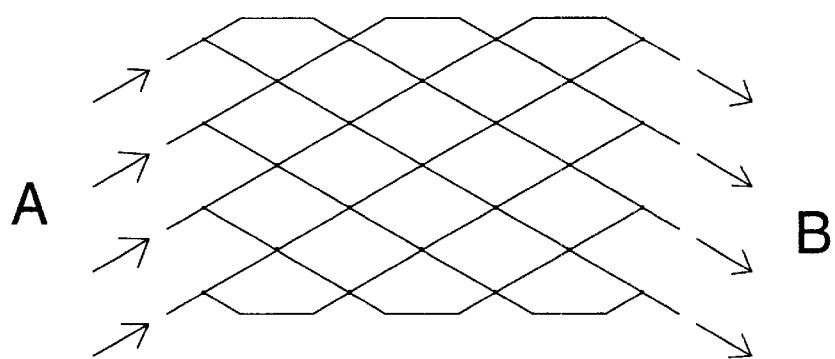
FIG. 3 is schematic diagram of another type of waveguide based optical cross-connect.
Figure 21:
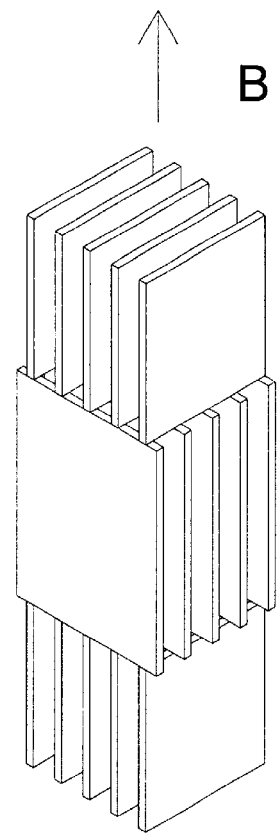
FIG. 21 is a diagram of yet another embodiment of an optical switch according to the present invention.

In switch architectures such as that described with reference to FIG. 3 above, the path lengths are all equal, so additional path length equalization is not required. As another embodiment of the present invention, a three-stage, path-length equalized cross-connect can be arranged as shown in FIG. 21 using sub-switches of the type shown in FIG. 3.

Although it is presently preferred to use a Clos-network in the multi-stage optical cross-connects of the present invention, the present invention may also take the form of rearrangeably non-blocking cross-connects, rather than rigorously non-blocking cross-connects, as well as cross-connects having redundancy above that required in a Clos network. Such increased or decreased redundancy may be achieved, as desired, by increasing or decreasing the number of sub-switches in the second stage relative to the number required for a Clos network. Decreased redundancy allows fewer total cross-points in exchange for higher risk of a blocking problem requiring rearrangement. Increased redundancy provides greater failure resistance in the event of failure of one or more individual MEMS mirrors or other switch devices employed in the cross-connect.

It will be apparent to those of ordinary skill in the pertinent art that modifications and variations can be made to the present invention, particularly as to the type of switch device, type of waveguides or light beams used, and the like. The switch architecture disclosed herein provides advantages with a wide variety of existing technologies, including both waveguide-based and free-space optical switch technologies. It will likewise be apparent to those of ordinary skill in the art that various other modifications and variations can be made to the present invention without departing from the spirit and scope of the invention. Thus, it is intended that the present invention cover the modifications and variations of this invention provided they come within the scope of the appended claims and their equivalents.

What is claimed is:

1. An optical cross-connect including:
   first stage including a plurality of first stage sub-switches each structured and positioned so as to receive inputs along a plurality of first stage input paths and to send outputs along a plurality of first stage output paths;
   a second stage including a plurality of second stage sub-switches each structured and positioned so as to receive inputs along a plurality of second stage input paths and to send outputs along a plurality of second stage output paths; and
   a third stage including a plurality of third-stage sub-switches each structured and positioned so as to receive inputs along a plurality of third stage input paths and to send outputs along a plurality of third stage output paths,
   wherein, for each first stage sub-switch of the plurality of first stage sub-switches, each of the output paths of said sub-switch is each aligned with an input path of a respective second stage sub-switch of the plurality of second-stage sub-switches and wherein each sub-switch of each stage is arranged on an individual layer of a stack of sub-switches within the respective stage.

2. The optical cross-connect of claim 1 wherein, for each second stage sub-switch, each of the output paths of said sub-switch is each aligned with an input path of a respective third stage sub-switch.

3. The optical cross-connect of claim 1 wherein all the first, second, and third stage input and output paths are positioned along a common plane.

4. A multi-stage optical cross-connect including:
   a first stage including multiple first-stage layers, each first-stage layer including a non-blocking cross-connect sub-switch having inputs and outputs, the first-stage layers arranged such that the inputs and outputs of the first-stage layers are arranged in respective two-dimensional first-stage input and output matrices;
   a second stage including multiple second-stage layers, each second-stage layer including a non-blocking cross-connect sub-switch having inputs and outputs, the second-stage layers arranged such that the inputs and outputs of the second-stage layers are arranged in respective two-dimensional second-stage input and output matrices; and
   a third stage including multiple third-stage layers, each third-stage layer including a non-blocking cross-connect sub-switch having inputs and outputs, the third-stage layers arranged such that the inputs and outputs of the third-stage layers are arranged in respective two-dimensional third-stage input and output matrices,
   wherein each of said outputs of the first-stage output matrix is optically connected to a respective input of said inputs of the second-stage input matrix via respective non-interleaving first-to-second-stage optical connections, and wherein each of said outputs of the second-stage output matrix is optically connected to a respective input of said inputs of the third-stage input matrix via respective non-interleaving second-to-third-stage optical connections and wherein the first-to-second stage optical connections include free-space optical beams.

5. The multi-stage optical cross-connect of claim 4 wherein the first-to-second stage optical connections include flexible waveguides.

6. The multi-stage optical cross-connect of claim 4 wherein the first-to-second stage optical connections include only straight, non-curved waveguides.

7. An optical switch for switching optical signals including:
- a plurality of input-stage planar waveguide substrates, each input-stage planar waveguide substrate of the plurality of input-stage planar waveguide substrates including a plurality of input waveguides and a plurality of output waveguides intersecting the plurality of input waveguides;
- a plurality of intermediate stage planar waveguide substrates positioned crossways relative to said plurality of input-stage planar waveguide substrates, each intermediate stage planar waveguide substrate of the plurality of intermediate stage planar waveguide substrates including a plurality of input waveguides and a plurality of output waveguides intersecting the plurality of input waveguides; and
- a plurality of output-stage planar waveguide substrates arranged crossways relative to said plurality of intermediate stage planar waveguide substrates, each output-stage planar waveguide substrate of the plurality of output-stage planar waveguide substrates including a plurality of input waveguides and a plurality of output waveguides intersecting the plurality of input waveguides wherein each output waveguide of the plurality of output waveguides of an input-stage planar waveguide substrate of the plurality of input-stage planar waveguide substrates is optically coupled to an input waveguide of the plurality of input waveguides of a respective intermediate stage planar waveguide substrate of the plurality of intermediate stage planar waveguide substrates.

8. The optical switch of claim 7, wherein each output waveguide of the plurality of output waveguides of the input-stage planar waveguide substrate of the plurality of input-stage planar waveguide substrates is optically coupled to the input waveguide of the plurality of input waveguides of the respective intermediate stage planar waveguide substrate via optical fibers.

9. The optical switch of claim 7, wherein each output waveguide of the plurality of output waveguides of the input-stage planar waveguide substrate of the plurality of input-stage planar waveguide substrates is optically coupled to the input waveguide of the plurality of input waveguides of the respective intermediate stage planar waveguide substrate via direct abutment of the respective waveguides.

10. The optical switch of claim 7, wherein each output waveguide of the plurality of output waveguides of the input-stage planar waveguide substrate of the plurality of input-stage planar waveguide substrates is optically coupled to the input waveguide of the plurality of input waveguides of the respective intermediate stage planar waveguide substrate via direct abutment of the respective waveguides together with an index matching medium between the abutting waveguides.

11. An optical switch device including a plurality of waveguide-based subswitches, the waveguides of each subswitch defining a respective subswitch plane, the subswitches arranged in at least first, second, and third stages, the subswitches of each stage being positioned such that the first-stage subswitch planes intersect the second-stage subswitch planes, and such that the third-stage subswitch planes intersect the second-stage subswitch planes and wherein the first stage subswitches are optically connected to the second stage subswitches via direct abutment of selected planar waveguides of the first stage subswitches and selected planar waveguides of the second stage subswitches.

12. The optical switch device of claim 11 wherein the first stage subswitches are optically connected to the second stage subswitches via optical fibers.

13. An optical switch device including a plurality of waveguide-based subswitches, the waveguides of each subswitch defining a respective subswitch plane, the subswitches arranged in at least first, second, and third stages, the subswitches of each stage being positioned such that the first-stage subswitch planes intersect the second-stage subswitch planes, and such that the third-stage subswitch planes intersect the second-stage subswitch planes wherein the subswitches are positioned and arranged in a three-stage Clos network.

14. An optical switch device including a plurality of waveguide-based subswitches, the waveguides of each subswitch defining a respective subswitch plane, the subswitches arranged in at least first, second, and third stages, the subswitches of each stage being positioned such that the first-stage subswitch planes intersect the second-stage subswitch planes, and such that the third-stage subswitch planes intersect the second-stage subswitch planes wherein the subswitches of the second stage are sufficient in number to provide at least the connectivity of a three-stage Clos network.

15. The optical switch device of claim 14 wherein the subswitches of the second stage are sufficient in number to provide at greater connectivity than that of a three-stage Clos network, whereby reliability of the switch device may be enhanced.

16. The optical switch device of claim 11 wherein the subswitches of the second stage are insufficient in number to provide at least the connectivity of a three-stage Clos network.

17. The optical switch device of claim 11 wherein each subswitch includes a respective individual substrate supporting the waveguides of said subswitch.

18. An optical switch device including a plurality of waveguide-based subswitches, the waveguides of each subswitch defining a respective subswitch plane, the subswitches arranged in at least first, second, and third stages, the subswitches of each stage being positioned such that the first-stage subswitch planes intersect the second-stage subswitch planes, and such that the third-stage subswitch planes intersect the second-stage subswitch planes wherein each subswitch of the first stage is positioned within a respective layer, a plurality of layers of first stage subswitches being arranged in a stack and wherein the respective layers within the stack are supported by a common substrate.

19. The optical switch device of claim 18 wherein the respective layers within the stack are each supported on a respective substrate.

20. An optical switch device including a plurality of waveguide-based subswitches grouped into a first stage of M subswitches, a second stage of N subswitches, and a third stage of O subswitches, where M, N, and O are each positive integers greater than one, each first-stage subswitch including L input waveguides and N output waveguides intersecting in L×N switch points where L is a positive integer greater than one, the L×N intersecting waveguides defining a respective first-stage subswitch plane, each second-stage subswitch including M input waveguides and O output waveguides intersecting in M×O switch points, the M×O intersecting waveguides defining a respective second-stage subswitch plane, each third-stage subswitch including N input and P output waveguides intersecting in N×P switch points where P is a positive integer greater than one, the N×P intersecting waveguides defining a respective third-stage subswitch plane, wherein each of the first-stage subswitch planes intersects each of the second-stage subswitch planes such that, for each first-stage subswitch, each of the N output wave guides may be optically coupled to a respective one of the N second-stage subswitches without the use of interleaving optical coupling paths, and wherein each of the third-stage subswitch planes intersects each of the second-stage subswitch planes such that, for each second-stage subswitch, each of the O output waveguides may be optically coupled to a respective one of the O third-stage subswitches without the use of interleaving optical coupling paths.

21. An optical switch device including a plurality of waveguide-based subswitches, each subswitch having multiple subswitch optical paths through which optical signals may propagate through the subswitch, the optical paths of the subswitches being optically coupled so as to form multiple switch-device optical paths through which optical signals may propagate through the optical switch device, the subswitches being grouped into first, second, and third substages, the subswitch optical paths of each subswitch of the second substage each having a given effective subswitch path length, the subswitch optical paths of each subswitch of the first and third substages not each having an identical effective subswitch path length, the switch-device optical paths each having a given effective switch-device path length so as to provide each signal that may propagate through the switch device with the same effective switch-device path length.

22. An optical switch device including a plurality of subswitches, each subswitch including entrance waveguides oriented along an entrance direction and exit waveguides oriented along an exit direction with each entrance waveguide intersecting each exit waveguide, the subswitches each including one or more propagation control devices capable of redirecting an optical signal from an input waveguide into a desired intersecting output waveguide, the subswitches being grouped into first, second, and third stages with each exit waveguide of each first stage subswitch being optically connected to one of the entrance waveguides of a respective second stage subswitch, and each exit waveguide of each second stage subswitch being optically connected to one of the entrance waveguides of a respective third stage subswitch, wherein, in each subswitch of the first stage, the exit waveguides each have a given exit waveguide active length while the entrance waveguides are of varying active lengths such that the length of any given optical path through the subswitch is independent of the particular entrance waveguide forming a part of that given optical path, and in each subswitch of the third stage, the entrance waveguides each have a given entrance waveguide active length while the exit waveguides are of varying active lengths such that the length of any given optical path through the subswitch is independent of the particular exit waveguide forming a part of that given optical path, and in each subswitch of the second stage, the entrance waveguides are of varying active lengths and the exit waveguides are of varying active lengths, such that the length of any given optical path through the subswitch is independent of the particular entrance waveguide forming a part of that given optical path and is independent of the particular exit waveguide forming a part of that given optical path.

23. A single-substrate planar-waveguide based N-stage optical switch device, where N is an integer greater than two, wherein switch points are arranged on the substrate such that every possible optical signal path through the switch device includes at most N active switch points and exactly N changes of direction.

24. An N-stage optical switch having multiple optical inputs and multiple optical outputs, N being an integer greater than two, the switch including intersecting planar waveguides and propagation control devices capable of selectively directing light from one of the waveguides to another of the waveguides, wherein the propagation control devices are positioned and arranged relative to each other such that, for any optical path within the switch from an optical input to an optical output, said optical path includes not more than N active propagation control devices and N changes of direction.

* * * * *